Oct. 6, 1953 R. HELL ET AL 2,654,802

APPARATUS FOR SYNCHRONIZING RECEIVERS IN FACSIMILE PRINTING SYSTEMS

Filed Oct. 7, 1950 6 Sheets-Sheet 1

Inventors.
Rudolf Hell, &
Heinz Taudt,
By. [signature] Atty.

Inventors.
Rudolf Hell, &
Heinz Taudt.
By [signature] Atty.

Inventors.
Rudolf Hell, &
Heinz Taudt.
By. [signature] Att'y.

Inventors.
Rudolf Hell, &
Heinz Taudt.
By [signature] Atty.

Inventors.
Rudolf Hell, &
Heinz Taudt.
By [signature] Atty.

Inventors.
Rudolf Hell &
Heinz Taudt.
By [signature] Att'y.

Patented Oct. 6, 1953 2,654,802

UNITED STATES PATENT OFFICE 2,654,802

APPARATUS FOR SYNCHRONIZING RECEIVERS IN FACSIMILE PRINTING SYSTEMS

Rudolf Hell, Kiel-Dietrichsdorf, and Heinz Taudt, Blickstedt, near Kiel, Germany, assignors to Siemens & Halske, Aktiengesellschaft, Munich and Berlin-Siemensstadt, Germany, a German corporation Application October 7, 1950, Serial No. 188,928
In Germany March 14, 1949

36 Claims. (Cl. 178—69.5)

This invention is concerned with a facsimile synchronizing system of the type wherein the symbols are individually subdivided into image points or dots which are transmitted in the form of fixed impulse series for continuous scanning and printing at the receiver.

In contrast to the usual start-stop methods, synchronization is accomplished in such a system by employing the incoming telegraphic signals, which correspond to the symbols transmitted, independently of the visual reproduction thereof, for controlling the phase-regulating means through the medium of contacts which are actuated by operating means on the shaft of the receiver motor and which scan the margins of the recording tape or the like. The arrangement thus provides for the scanning of the image field on which the recording is to take place and for extending the scanning to the marginal zones thereof. For example, if the image field consists of five superimposed rows of image dots, it will be limited at the top and at the bottom by marginal zones which are traversed during the scanning in horizontal direction. There will be no recording of image dots upon these marginal zones in the presence of synchronous and co-phasal operation of the scanning means with the transmission of the telegraphic signals. If the scanning in the receiver drops out of step with the transmission by being either too fast or too slow, the recording of the image dots will either lag behind or will lead the transmission, and the symbols will be shifted upon the recording tape upwardly or downwardly. The entire symbol line will therefore have a rising or falling tendency.

Two solutions have been heretofore proposed in order to overcome this drawback. According to one solution, approximate synchronism is secured by means of a regulator, e. g., a centrifugal governor, coacting with the drive motor, and legible symbol images are obtained by reproduction in two superposed symbol lines. According to the other solution, the marginal zones are scanned in order to ascertain whether image signal impulses have been received thereon. If such is the case, the drive is either accelerated or retarded until no impulses appear upon the marginal zones, thereby securing the synchronism.

There are several ways of carrying out the latter method, all of which have various disadvantages. One of these ways provides two scanning members for the upper and lower image margins, respectively, while maintaining approximately synchronous operation of the motor by means of a centrifugal governor. The scanning for the upper image zone is effective to cause the symbol line to descend, while the scanning for the bottom zone is effective to bring about regulation in opposite direction, counteracting a dropping tendency and causing the symbol line to rise. This mode of operation is useful only when the deviations are relatively slight. If the deviations are such that they carry a number of image dots upwardly or downwardly, a symbol will overlap both marginal zones, so that the action of the two scanning means is constantly cancelled out, thus preventing effective regulation toward synchronous operation.

Another course was therefore adopted which included regulation of the drive of the receiver in such a manner that it exhibited a constant tendency to deviate from synchronism in one or the other direction; for example, the governor of the drive motor was adjusted to cause accelerated running of the motor. The correcting device which is controlled by the scanning of the margin is in such case so adjusted that it causes correction always in the contrary direction. The disadvantage of this arrangement is that it requires constantly operative correction. The symbols therefore deviate again from the horizontal, because the regulation ceases in the presence of prolonged space signals in which no impulses are received either in the symbol field or upon the marginal zones. The printed symbol lines are in such a system consequently very uneven.

It should be considered in this connection that start-stop operation has been previously proposed for the purpose of limiting each individual symbol. However, such procedure cancels the advantage of continuous recording.

An object of the invention is to further develop the first described system for the synchronization, by scanning the marginal zones which are contiguous to the symbol areas independently of the visual reproduction of the symbols, and to provide means for causing an accelerating or a retarding correction of the drive at such times when image dots are scanned at the marginal zones. The previously mentioned drawbacks are avoided by the provision of a correction circuit means comprising relay or like means, which maintain a correcting tendency once it has started to exert itself (acceleration or retardation) until no image dots appear upon the marginal zones for a predetermined period of time.

The foregoing object may be realized, for example, by the provision of two correction relays, one for each marginal zone, which operate in opposite corrective directions and which are connected in a circuit in such a manner that, when one becomes energized due to being first affected by an impulse, it blocks the other.

Another object is to provide means which exert a preference for one over the other correction means. One embodiment contemplates for this purpose to arrange only one of the correction relays so that it may be blocked, the other relay being arranged for preferred operation from the outset. In another embodiment, there are means provided for prolonging the operatively effective actuation of the correction relay by delaying its deenergization. The constant preference of one of the correction relays over the other is particularly effective in the presence of relatively slight deviations from synchronism in one or the other direction. Means are preferably provided for causing a blocking action only when the deviation of the symbols in a symbol line exceeds a predetermined amount.

In accordance with a further object of the invention, both correction relays are similarly constructed so that each can effect blocking of the other, and special delay means are provided to effect preference of one of the correction relays over the other. This is accomplished, e. g., by making the correction relay slow to energize. The delay in energizing may be effected, e. g., by suitable resistance-capacitance combinations in the circuit of the correction relays and effecting the correction as such, preferably by the use of an auxiliary relay arrangement. If the delay in energizing is relatively short, it will be effective to eliminate interference impulses; if it is adjusted for prolonged duration, which corresponds to the transmission time of a plurality of image dots, the correction relay will not respond either to interference impulses or to individual image dots, but only to dashes. There is therefore a very great probability that the correct delay means will respond first. The proper correcting relay is in this case the one which effects correction in a direction opposite to the direction in which the symbol type has deviated. In this case, assuming horizontal symbol field scanning, horizontal strokes (as they occur, e. g., in the letter E) will be scanned, and in the usual vertical scanning vertical strokes will be scanned as they occur, for example, in the letter I. It is preferable in the latter case that the zones which are scanned extend for a certain distance into the symbol field so that more than one image dot, i. e., a whole stroke, may be dealt with.

The prolonged energizing response which reacts only to dashes, i. e., to strokes, is of no value once the correction relay has become effective. It would indeed be desirable, from this moment on, to include all individual image dots for use in the correction procedure.

It is accordingly another object of the invention to provide an embodiment in which, after operative response of one correction relay and blocking of the other, the delay in energization is automatically reduced to a value so as to react to individual image dots. This object may be realized by switching off condensers provided for effecting the delay at the time of operative actuation of the correcting relay.

Still another object is to carry out the correction by the provision of a single relay which is acted on by the marginal scanning and determining the direction of correction by an auxiliary relay. The first noted relay which is involved in the scanning of the margin operates preferably in such a manner that it scans the entire marginal zone which embraces the upper and the lower symbol margin. The slow-to-energize periods are in this case so adjusted that the relay involved in the scanning of the image zone responds only to prolonged strokes.

In accordance with a particular embodiment of the invention, the correction relay and associated scanning means coact in such a manner that they determine within the image zone the position of the impulse-free scanning gap of a line entirely filled with image dots (I-stroke), which in correctly governed operation must fall within the marginal zone, and that they cause a falling correction if the symbol position has shifted upwardly and a rising correction if it has shifted downwardly. Such I-strokes occur in most of the letters of the alphabet so that this regulation becomes effective relatively frequently.

Still another object of the invention is to provide an embodiment comprising two scanning contacts and associated circuit means, one for the upper and one for the lower half of the symbol or image field, each of which separately establishes the sum of the voltages of the received impulses, and a polarized relay connected to said circuit, which is operatively responsive to the voltage differential for determining the direction in which the correction should take place.

The embodiment noted in the preceding paragraph may be modified by providing three scanning contacts coacting with corresponding relays having slow-to-energize periods which are so adjusted that the first one, which is involved in the scanning of a full line including the marginal zone, responds only to I-strokes, thereby preparing the other relays which cause, upon actuation responsive to impulses, a correction, one in one direction and the other in the opposite direction. Such other relay means are involved in the scanning of zones which supplement each other symmetrically to form at least one full line. Only one of these means which coacts with a zone that is fully occupied by image dots will become operatively effective.

It may happen in such, as well as in the previously mentioned cases, that the two oppositely acting relay-controlled correcting means become simultaneously prepared for operation. In the last mentioned embodiment, this will be the case if the gap appears exactly centrally of the image zone. Means are therefore provided, in accordance with the invention, which in such a case will always give preference for corrective operation in one direction. This may be done, e. g., by initially adjusting the energizing response or energizing sensitiveness of the relays employed in the corresponding circuit.

In accordance with another object of the invention, means are provided for causing corrective operation based upon the symbol field scanning only in the presence of considerable deviations of the symbols from their proper positions.

This object may be realized by causing operative actuation of the correction means upon beginning the transmission and rendering the corrective operation, based upon the symbol field scanning, inoperative after transmission of a predetermined number of symbols, e. g., after transmission of fifteen symbols. The thought behind this measure is the assumption that sufficient synchronization is at such time obtained, so that only slight deviations might occur which can be corrected exclusively by the marginal scanning.

The object may also be realized by the provision of a fifth scanning zone which is positioned exactly midway of the two marginal zones. A contact may be controlled by the scanning of this area which normally shunts the circuit for the symbol field scanning and which is opened at times when image dots are received incident to the scanning of the center of the marginal zones.

A further object is realized in an embodiment in which the invention is combined with known synchronizing means in such a manner that the invention becomes effective and operatively supersedes the known means only in the presence of considerable deviations of the symbols from their proper positions; relatively small deviations covering, for example, only one-half of a marginal zone, being regulated by the known means. The switching-over from one to the other correction means may be effected, e. g., by arranging two marginal overlapping scanning areas and scanning contacts with associated correction relay means to cause switching over to rapid regulation responsive to actuation thereof within the overlapping interval.

The invention also contemplates the provision of regulating means which become automatically effective in different ranges of symbol deviations from the required positions, and especially to modify the phase in the presence of considerable deviations while varying the speed of rotation of the drive in the presence of slight deviations. The respective speeds of regulation are preferably differently adjusted; i. e., the phase regulation is provided for rapid operation, while the rotary speed regulation is accomplished more sluggishly. The two different regulating ranges are determined by two different zones within the marginal areas which surround the symbol fields and which are also included in the scanning. The impulses which fall into the marginal areas operate two different relay means for the regulation of the speed of rotation and for the phase regulation, respectively, depending upon whether they fall within a zone in which the deviation from the required value is great or slight.

The border area of the deviations from a desired value may be subdivided into more than two zones so that further synchronizing means may be automatically introduced which differ as to the speed of regulation and effect separate or combined regulation of phase and speed of rotation, respectively.

Circuit means are provided for the phase regulation, which temporarily superimpose upon the drive which is to be regulated an acceleration or retardation. Circuit means may further be provided which change the frequency of the speed-stabilizing arrangement to a higher or lower speed for the purpose of regulating the speed of rotation. If only the speed of the stabilizing arrangement were varied, the speed of rotation of the drive would gradually and automatically approach the speed thereof. In order to accelerate the regulation, variation of the frequency of the stabilizing device is effected simultaneously with effecting an acceleration or retardation, as the case may be, of the drive to be regulated, until the adjusted speed is reached.

The advantages obtained by this embodiment are noted below:

Considerable displacement of the individual symbol image dots at the beginning of a transmission might be caused either by a wrong speed of rotation or by an incorrect phase. Just which of the two may be the real cause cannot be ascertained in an automatic synchronizing system. It follows therefore that a variation of the speed of rotation might bring the danger of changing, by such correction, the correct speed to a wrong speed.

The invention therefore proposes, in the presence of considerable deviations, to cancel first the considerable scanning dot displacement by rapid acceleration or retardation of the device. On the other hand, in the case of slight displacements of the image dots, a slow and sluggish regulation is applied in which the resulting acceleration or retardation of the speed is not limited to the short correcting impulses, but is continued until new correcting impulses are set up. This sluggish regulation includes variation of the frequency of the speed-stabilizing device.

The invention is not limited in its application to the transmission of symbols in systems of the class described herein, but may also be employed in television systems.

The principal difference between the procedure in accordance with the invention, as compared with the combined phase and speed regulation in television systems, resides in automatic regulation, depending on the degree of deviation as contrasted with the manual regulation in known systems.

The objects and features indicated above and other objects and features will appear from the description of certain embodiments, which will be rendered with reference to the accompanying drawings. In these drawings, Fig. 1 is a schematic sectional view of the symbol field;

Figures 1, 2:
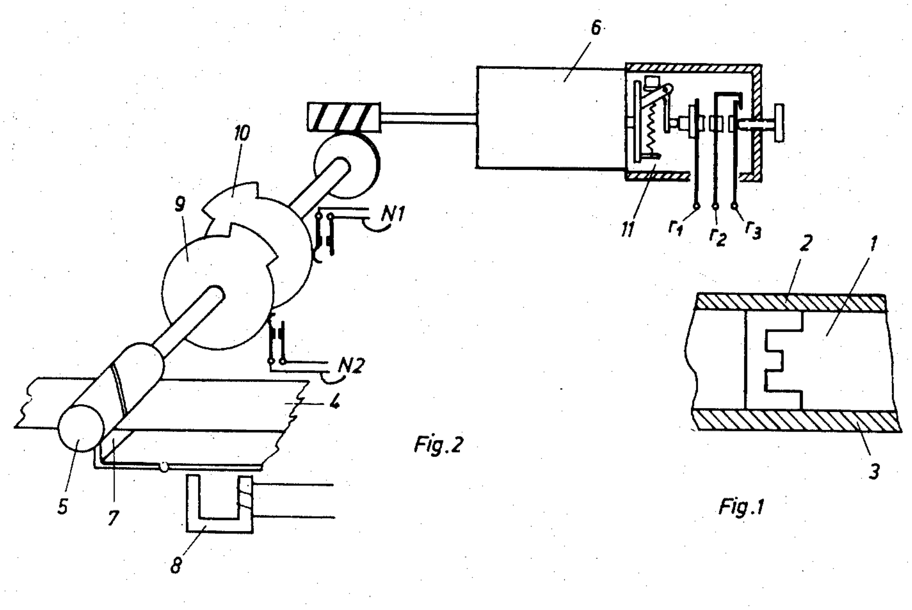
Fig. 2 shows in diagrammatic manner essential parts of a receiver device made in accordance with the invention.

The different zones of a symbol field are apparent from Fig. 1. The symbol image zone 1 extends over the height of five image dots, while the upper margin 2 and the lower margin 3 extend each over the height of one image dot. The margins 2 and 3 are shown shaded to indicate them more clearly. Incident to the scanning of the whole region, which normally takes place from the bottom upwardly, the scanning of the lower zone 3 follows directly the scanning of the upper zone 2 so that both marginal zones 2 and 3 basically constitute a single zone of the height of two image dots.

The basic thought of synchronous regulation contemplates regulation at such times when image dots appear upon one of the two marginal zones 2 or 3, that is, when the types or symbols are shifted upwardly or downwardly.

Fig. 2 illustrates an example of a scanning device for the symbol and for the marginal zones.

Numeral 5 in Fig. 2 indicates the printing spindle driven by the motor 6. Against the helix on this spindle 5 is pressed the recording tape or paper strip 4 by means of a printer bar having the knife edge 7 which is actuated in step with the incoming impulses delivered to the printer magnet 8. Image or symbol dots are thereby impressed or printed on the tape 4.

Figure 3:
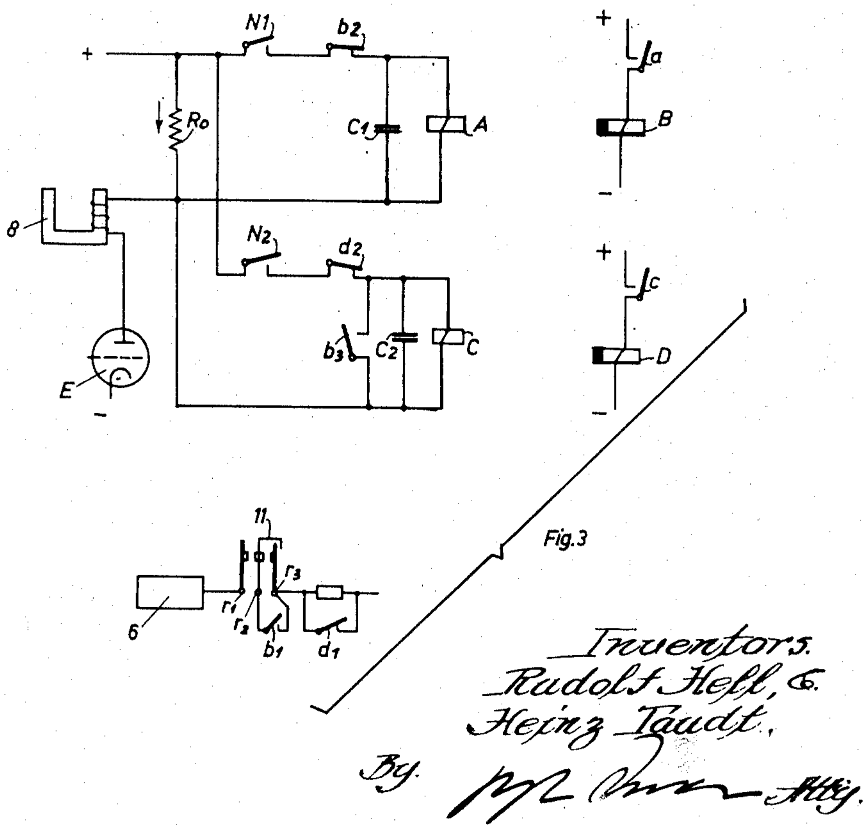
Figs. 3–6, 8, 10–11 and 13–14 illustrate diagrammatically various circuit arrangements for carrying out the correction.

Numerals 9 and 10 indicate two continuously rotating cam disks which effect the scanning of the marginal zones 2 and 3 (see Fig. 1), the cam on the disk 9 scanning the lower marginal zone 2 and the cam on the disk 10 immediately thereafter scanning the upper marginal zone 3. If image dots appear upon the marginal zones, the impulses are passed, in accordance with the invention, over the contacts $N_1$ and $N_2$ which are actuated by the cams, to a circuit arrangement shown diagrammatically in Fig. 3 which reacts relative to the two marginal zones in opposite direction. The circuit operates as follows:

The contact $N_1$, which reacts with the upper image or symbol margin, energizes the relay A when a recording impulse occurs while it is in closed position. The relay A, upon energizing, closes its contact *a* to energize a second relay B which is slow to release, so that its operation is effective even after termination of the impulse which caused its actuation. Contact $b_1$ of relay B reduces the speed of the motor 6 by switching the rotary governor 11, which has a plurality of speed ranges, to a lower speed range in a manner which is apparent from the drawings. At the same time contact $b_3$ of relay B shunts relay C, thereby blocking the other leg of the circuit which is controlled by the cam contact $N_2$ coacting with a lower margin 3. Contact $b_2$ of relay B is opened responsive to deenergization of relay B, which disconnects the relay A in order to prevent back discharge of the condenser $C_1$ incident to the next successive closure of contact $N_1$, for example, if no new impulse is received over $N_1$. The condensers $C_1$ and $C_2$ serve to delay restoration of the relays A and C and therewith of the contacts *a* and *c* actuated thereby so that the correction persists for some time beyond the first impulse. If the recording should not be in phase at the end of the delay period of relay B, there will occur another energizing impulse for relay A over the contact $N_1$, thus renewing the delay period for relay B while it is still in operated position. The cycle continues until the recording of the symbols is in phase. No counterimpulse can be set up for the duration of this operation, since the relay group C—D controlled by the contact $N_2$ is blocked by the contact $b_3$. In other words, the correcting tendency which is once set up is maintained throughout the entire regulating operation.

The above described sequence of operations applies for the relays C and D, if an impulse first enters the circuit of relay C over the contact $N_2$. In this case the governor 11 is adjusted to a higher speed by the actuation of contact $d_1$.

The considerations described above with reference to Figs. 1–3, as well as all the considerations which are yet to be explained, are similarly applicable to a page printer.

Figure 4:
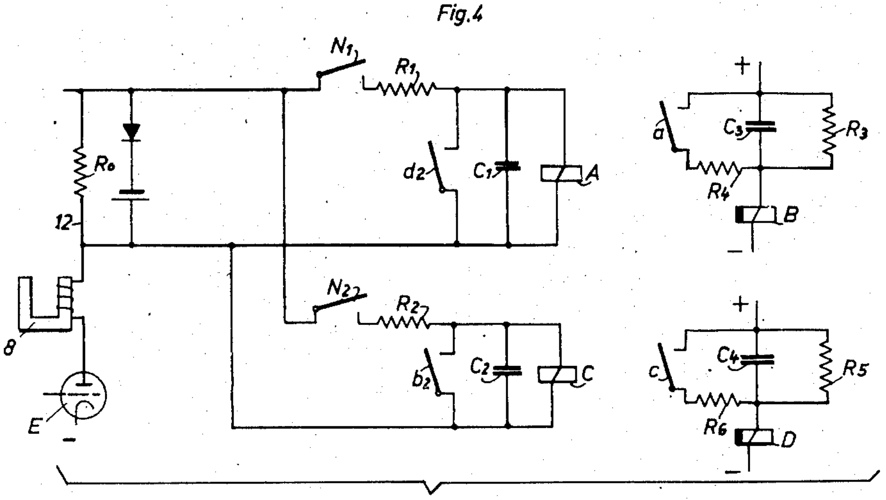

In Fig. 4 is shown another embodiment in which the two relays serving as correcting means are of similar structure and adapted to disconnect each other. Reference characters appearing in this figure, which correspond to like characters in Fig. 3, indicate identical elements. The difference between the two arrangements resides substantially in the provision of a blocking means $d_2$ for the relay A which is controlled by relay D and shunts the relay A. The resistors $R_1$ and $R_2$ and the capacitances $C_1$ and $C_2$ cause a slow-to-energize response for the relays A and C, to prevent energization of these relays in response to interference impulses. The delay in energizing may correspond at least to the scanning time for an image dot. The relays B and D are, in addition, associated with resistance-capacitance combinations $C_3$—$R_3$—$R_4$ and $C_4$—$R_5$—$R_6$, respectively, to provide for a considerable delay in the deenergization thereof, thereby maintaining operative actuation of the corrective means beyond the time they are directly acted upon. In addition, a voltage-limiting arrangement 12 is provided, comprising a parallel-connected rectifier with countervoltage. The arrangement provides for voltage limitation of the voltage drop at the resistance $R_o$ which is caused by the printing current, thus making the operation of the corrective relays independent of the value of the printing current.

Figure 5:
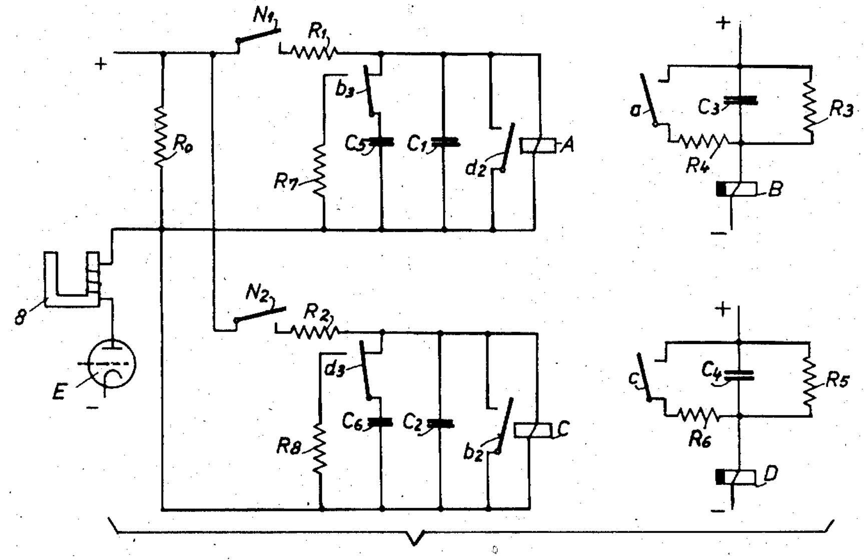

Fig. 5 represents a modified embodiment. Reference characters used in this figure, which correspond to like characters in Fig. 4, again indicate identical parts. This embodiment differs from the one shown in Fig. 4 by the provision of auxiliary capacitances $C_5$ and $C_6$ which increase the operative response interval of the relays A and C so that these relays energize only responsive to a plurality of successive image dots, i. e., to whole strokes. The operative response interval thus amounts, for example, to three or four times the interval required for the scanning of one image dot. The energization response intervals are automatically reduced after operative actuation of the relays, in order to increase the regulating speed again and to include the individual dots for purposes of regulation. This is accomplished by actuation of one of the contacts $b_3$ or $d_3$ which are operated together with the remaining contacts of the relays B and C, respectively, for the purpose of disconnecting the condensers $C_5$ and $C_6$ and causing discharge thereby over the associated resistance $R_7$ or $R_8$.

Figure 6:
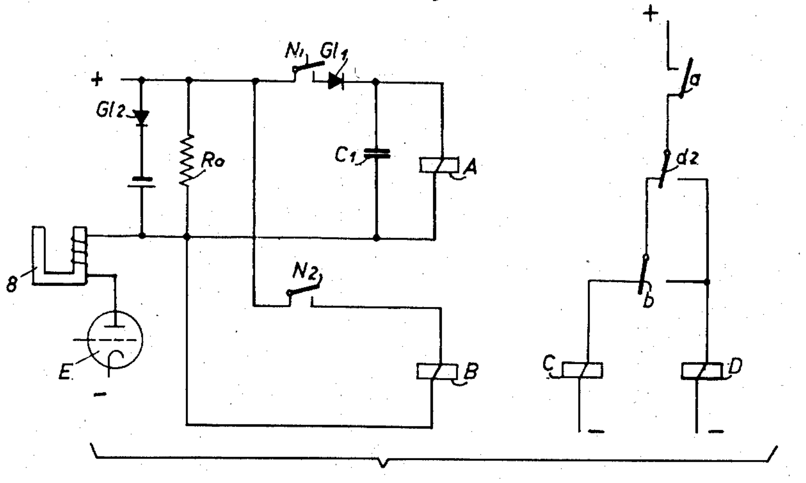
Figure 7:
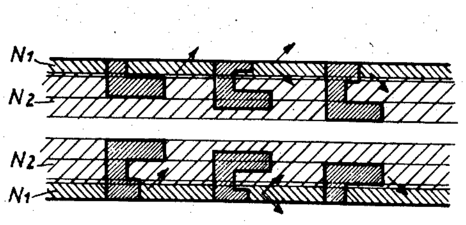
Figs. 7, 8*a*, 9 and 12 indicate different manners of subdividing the symbol field into scanning zones.

Figs. 6 and 7 indicate another embodiment in which the scanning involves the entire marginal zones, i. e., the entire area, including the upper and lower margins. A cam having the contact $N_1$ is adjusted to these areas; a second cam is provided for scanning a region of the symbol area. The contact $N_1$ causes energization of relay A which always causes regulation in a predetermined direction. The second scanning of the symbol area, which involves the contact $N_2$, ascertains whether or not the regulation takes place in the proper direction. Let us assume, for example, that the relay A always regulates so that the types or symbols rise. The regulation tendency is therefore correct when the symbols have a tendency to shift downwardly, as indicated by the position of the first E in Fig. 7. But, if the symbols lie too high, as indicated by the position of the third E in Fig. 7, a switching operation must take place to utilize the impulses delivered over the contact $N_1$ for slowing down the motor. The symbols therefore must be shifted in the directions indicated in Fig. 7 by the arrows.

This switching operation is carried out by another contact which begins to operate 1¾ of an image dot preceding the upper symbol margin and ceases to operate ¼ of an image dot after the upper margin, provided that printing current flows at least ⅝ of this time. Since the symbols are printed from the bottom upwardly, the operation makes sure that the switching caused by contact $N_2$ takes place prior to the regulation initiated by the contact $N_2$. The thought behind this measure, therefore, is to ascertain whether the image dots which are being scanned at the marginal zone belong to the upper symbol area of a preceding symbol which had already been scanned, or to the next succeeding symbol which appears at the lower margin of the next symbol line. The procedure ascertains in this manner whether or not a gap occurs in the image field shortly before the image dot detected in the marginal zone. If a symbol impulse is detected by the scanning involving cam contact $N_2$, the relay B will become operative to cause energization of relay D by the actuation of contact *b*, and the latter relay effects regulation in opposite direction.

The rectifier $Gl_1$ prevents back discharge of the condenser $C_1$ over the contact $N_1$ and the resistance $Ro$. The limiting rectifier $Gl_2$ serves to maintain the corrected delay intervals. The relay A, upon energization responsive to a marginal impulse detected upon closure of contact $N_1$, causes energization of relay C over contacts $a—d_2—b$, and the latter relay switches the motor to a higher speed. Relay B will be energized if a printing current of a certain duration, approximately 1¾ image dots, has occurred during the closure of contact $N_2$ prior to the regulating impulse indicated by the contact $N_1$. Relay B responds with a delay which corresponds to the scanning time of cam $N_2$. Contact *b* is thereby switched over to relay D so that the circuit controlled by contact *a* will be effective to energize relay D and the latter actuates a contact which causes switching of the motor to a lower speed.

Figure 8A:
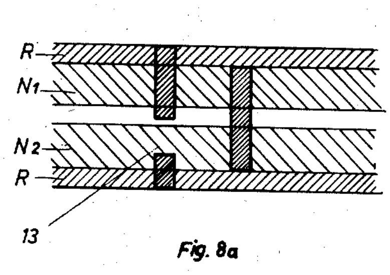
Figure 8:
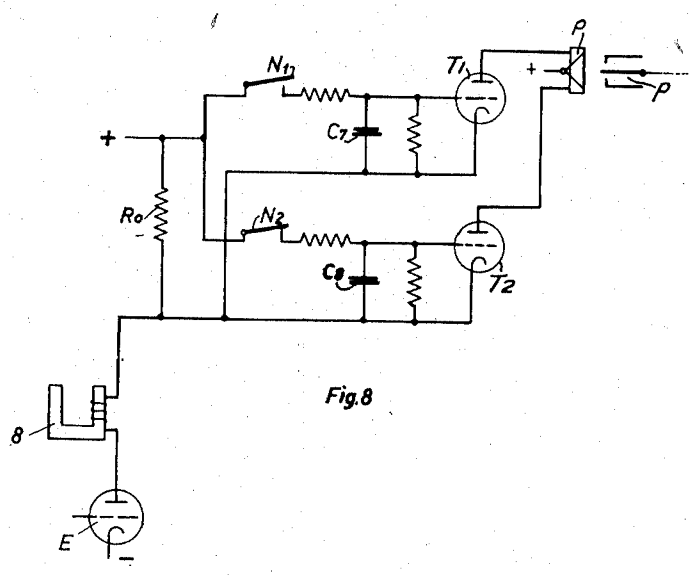

The embodiment shown in Fig. 8 provides for marginal and symbol field scanning, just like the last described embodiment. Fig. 8*a* shows the subdivision of the zone which is being scanned by the different scanning means. Two cam contacts $N_1$ and $N_2$ scan two portions of the symbol field, which are symmetrical relative to one another. It is assumed, to give an example of this embodiment, that the two upper and the two lower image dots are being scanned, leaving centrally a gap extending approximately over the width of one image dot.

The arrangement may also operate in such a manner that the two zones supplement each other to form the image field, or that they overlap. A third cam R is provided for scanning the entire marginal zone. The correct position of the symbol is indicated in Fig. 8*a* at the right, showing the letter I which is positioned exactly centrally of the symbol field. At the left the letter I is shown displaced upwardly, the marginal gap 13 having shifted into the symbol field within the scanning area of the cam $N_2$.

The cam contacts $N_1$ and $N_2$ effect successive charging of the condensers $C_7$ and $C_8$. A polarized relay P is caused to energize in a direction determined by the condenser having a higher charge, over a circuit including the tubes $T_1$ and $T_2$ shown in Fig. 8. According to the position assumed by the armature *p* of relay P, the speed of the printer motor will be either accelerated or slowed down. The circuit becomes, however, effective only when it has been prepared for operation by the scanning cam R. This is accomplished by means of a suitable switching and relay arrangement (not shown) which is actuated by the cam R when the latter receives symbol impulses.

The relay arrangements of Figs. 2–7 may of course be modified by using tube or other suitable means, and the circuit shown in Fig. 8 may be similarly modified for relay operation.

Figure 9:
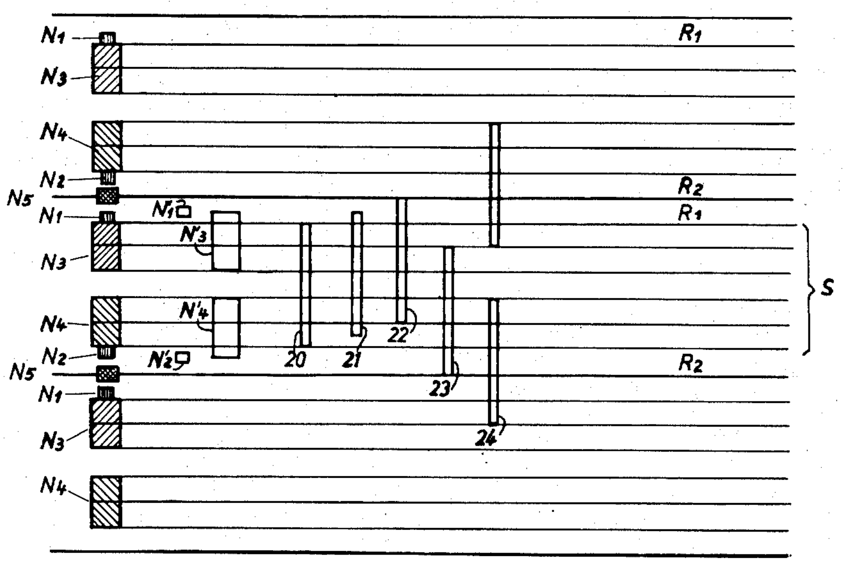
Figure 10:
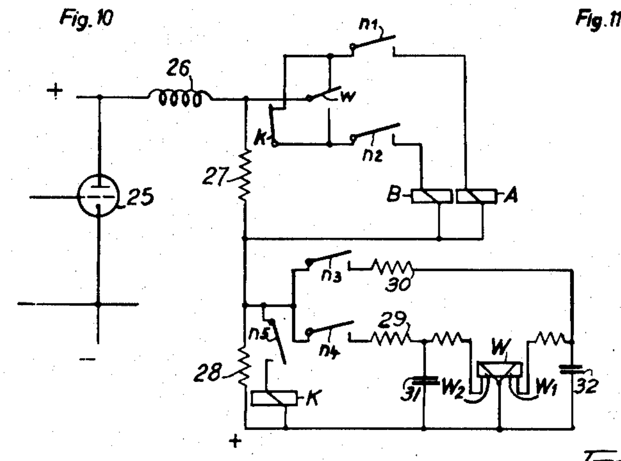
Figure 11:
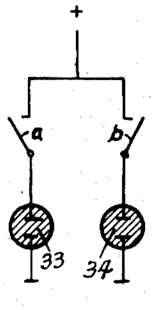

Fig. 9 shows schematically the scanning zones of the symbol field which is being scanned by four cams, and Figs. 10 and 11 indicate an embodiment of the corresponding correction circuit.

Letter S in Fig. 9 indicates the symbol field of a printer device (tape or page printer) of the present invention in which are scanned the symbols which are subdivided into individual symbol or image dots. The scanning takes place along vertically extending scanning lines from the bottom upwardly, the various lines being scanned successively from left to right. Each scanning line comprises five vertically successive image dots within the symbol field and one scanning dot above and another below the margins. One such scanning line is indicated in Fig. 9 by an I-stroke extending over the entire height of the symbol field in the position 20. Reference characters $R_1$ and $R_2$ indicate the marginal zones, each of a height of one scanning dot. Several symbol fields, each with its marginal zones, are shown in Fig. 9 one below the other. The I-strokes in the positions 21 and 22 are displaced upwardly from the symbol field S into the upper marginal zone, while the I, in position 23, extends downwardly into the lower marginal zone. The position 20 shows the correct position of the I-stroke, extending exactly within the symbol field. In case the displacement should be greater than indicated at 22 or 23, the I-stroke will move into the corresponding adjacent marginal zones, as shown at 24. In this case the scanning gap, which should fall within the two marginal zones, will occur centrally of the symbol field.

In accordance with the invention, there are provided four continuously rotating scanning cams. These four cams are so adjusted that they successively scan the four cross-hatched zones $N_2—N_4—N_3—N_1$; i. e., at the moment in which the zone $N_1$ of the upper marginal area $R_1$ has been scanned, the corresponding cam actuates a contact which closes an associated connection circuit. Similar operations are initiated by the cams coacting with the scanning zones $N_2—N_3—N_4$.

Each of the two pairs of cams $N_1$, $N_2$ and $N_3$, $N_4$ may thus effect a correction of the driving speed of the receiving element. For example, if the I-stroke should be in the position 21, an impulse will be received through the medium of the cam scanning $N_1$, which is effective in the correcting circuit to bring about a corresponding correction of the driving speed. If the displacement of the symbol is in downward direction, as indicated at 23, the correction is effected in opposite direction by the cam scanning $N_2$.

In accordance with the invention, the cams scanning $N_1$ and $N_2$ for the marginal zones $R_1$ and $R_2$ are combined with the cams scanning $N_3$ and $N_4$ for the symbol field in such a manner that a correction is only and solely effected at a time when both correction means are operative in the same direction. The area $N_5$ centrally of the two marginal zones is scanned by a fifth cam. The correction based upon the scanning of the symbol field becomes effective only when image dots are received within this area. For the remaining time the circuit for the scanning of the symbol field is disconnected.

An embodiment of a correction circuit for realizing these aspects of the invention is shown in Fig. 10. Numeral 25 indicates the output tube of a receiver amplifier which supplies current in the presence of impulses over the printing system 26 and resistances 27, 28. The printing system 26 serves for controlling the actuation of the scanning element which also effects the printing of the symbols. Current at the resistances 27, 28 is supplied to the correction circuits comprising four branches having the contacts $n_1$, $n_2$, $n_3$ and $n_4$. Each of these contacts is actuated by an associated cam $N_1$ to $N_4$, respectively. These contacts are successively closed in the succession $n_2$—$n_4$—$n_3$—$n_1$ incident to the scanning of the individual zones, since the scanning proceeds from the bottom upwardly, as previously described. The respective contacts are closed during the scanning intervals of the corresponding areas $N_1$ to $N_4$ shown cross-hatched in Fig. 9. A polarized relay W is provided which is energized in the circuit comprising the contacts $n_3$ and $n_4$. This relay actuates a contact $w$ which is disposed ahead of the contacts $n_1$ and $n_2$. The resistances 29, 30 and the condensers 31, 32 are so dimensioned that the two windings $W_1$ and $W_2$ of the polarized relay W can only energize when the duration of the impulses exceeds one image dot, e. g., when an impulse extends over 1¾ image dots. The arrangement thus becomes operatively effective only at times when I-strokes are received. The reference to I-strokes is of course not limited to the letter I, but is applicable to all letters or characters having vertically extending longitudinal strokes. The arrangement remains inoperative in the presence of shorter symbol elements which originate, e. g., from the transverse strokes in the letters E or F.

The required correction is effected by the relays A and B which initiate acceleration or slowing down, respectively, of the drive motor. Just which of the two relays is to be energized is determined by the actuation of the contact $w$. The correction becomes effective only at times when the contacts $n_1$ and $n_2$ are correspondingly actuated and receive impulses. During the scanning of the symbol area $N_5$ of the marginal zones the fifth cam closes contact $n_5$ and causes energization of the relay K by impulses received. Contact $k$, which shunts the contact $w$ for the remaining time, is thus opened, thereby making the circuit $n_3$—$n_4$—$w$ ineffective.

The operation of the circuit is as follows:

If the I-stroke is in the correct position 20, the two windings of the relay W receive equal current and the contact $w$ assumes a median position. The paths to the two correction relays A and B are in this case open and no regulation takes place. However, if the I is displaced downwardly, as indicated in Fig. 9 at 24, the entire zone $N_4$ will be filled with impulses, while only half of the zone $N_3$ is occupied by an image dot. The circuit comprising the resistance 29, condenser 31 and the winding $W_2$ of relay W therefore receives more current than the branch 30—32-$W_1$; i. e., the current in winding $W_2$ of the polarized relay is preponderant, causing actuation of the contact $w$ into its alternate position, thus preparing the circuit for relay B over contact $n_2$. Relay B energizes and effects the correction in the required direction.

The polarized relay (or another similarly operable device, e. g., a suitable electronic tube which may take its place) operates in such a manner that the contact $w$ is always maintained in its assumed position until switched into another direction by an impulse or until restored to normal by slow-to-release action of the relay.

In order to effect a particularly favorable coaction of the two pairs of cams $n_1$—$n_2$ and $n_2$—$n_4$, the invention proposes to arrange the scanning zones so that they overlap somewhat, as indicated in Fig. 9 at $N_3'$ and $N_4'$. These zones extend from the symbol somewhat into the marginal zones $R_1$ and $R_2$, respectively, so that they overlap therewith. The scanning zones $N_1'$ and $N_2'$ are disposed centrally of the marginal zones $R_1$ and $R_2$, as shown, each covering approximately ½ image dot. The scanning does not involve the entire marginal zone and the arrangement therefore results in the advantage that fewer interference impulses are received. The scanning areas are not directly adjacent the symbol field resulting in the further advantage of giving the symbol signals a certain play, for deviation from the symbol line, thus eliminating constant operation of the correcting means.

The circuit shown in Fig. 10 is merely intended to give an example. Additional switching means may be provided, e. g., means for limiting the amplitude of the received control impulses. Means may also be provided for maintaining an accelerating or slowing-up tendency, once it has been initiated, until such a time when no image dots appear upon the marginal zone for a predetermined interval. The correction relays or equivalent means may for this purpose be provided so as to operate with a corresponding inertia.

A particular feature of the invention contemplates the use with the correction circuit of a visual signal to indicate the direction or effect of a corrective operation. The operator is thus enabled to provide, if necessary, additional manual adjustment of the centrifugal governor of the drive motor. Such regulation may be desirable particularly at the start of a transmission, before corrections have taken place, to remedy considerable differences that might exist between the speeds of rotation of the drive motors at the receiver and at the transmitter.

The visual signal may be in the form of a suitable pointer-equipped indicating instrument operating with inertia or provided with delay means which is adjusted to the left or right, as the case may be, by operation of the corrective relays A and B. Another embodiment is indicated in Fig. 11, comprising two glow lamps 33, 34 which are controlled by contacts $a$ and $b$, respectively, of the relays A and B. These glow lamps are preferably arranged one above the other so as to indicate, upon operative actuation, by their respective positions, the corresponding upward and downward displacement of the symbols. Suitable optical means may take the place of the glow lamps, if desired.

Figure 12:
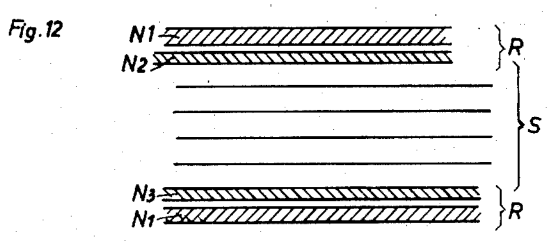
Figure 13:
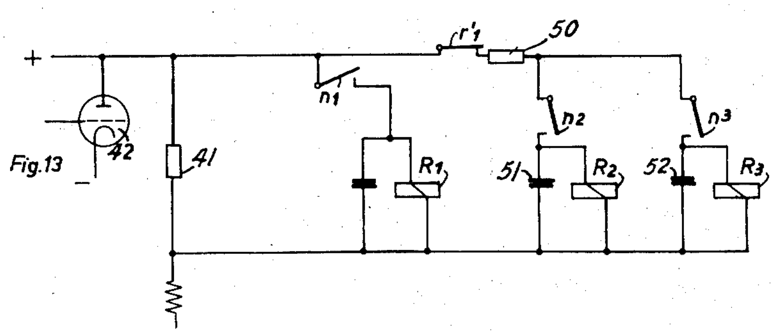
Figure 14:
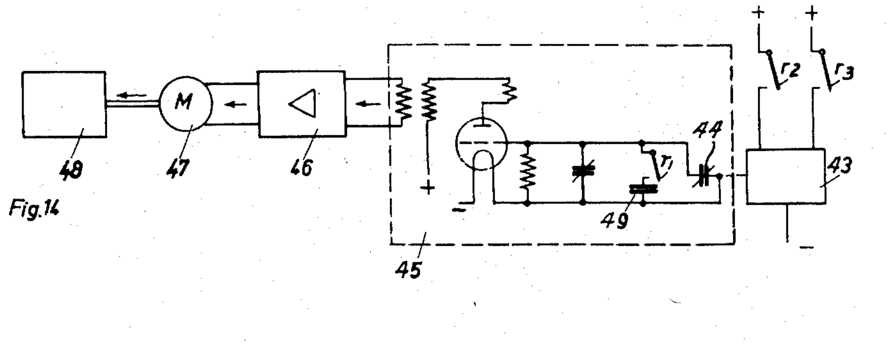

The embodiment illustrated in Figs. 12–14 operates with four cams and provides for different kinds of corrective measures.

Fig. 12 shows a symbol field S comprising five rows of image dots which are scanned from the bottom upwardly. The symbol field is limited by a marginal zone R extending over the width of two image dots. The two portions of the marginal zone R shown above and below the symbol field S merge into one another, since the scanning of the lower marginal half follows the scanning of the upper half of the marginal zone.

As before, there are provided a total of three scanning zones for the synchronization. There is, first, the zone $N_1$ which embraces the center of the marginal zone and in which image dots appear only if the symbols are considerably displaced from their proper positions; secondly, the area $N_2$ which extends along the upper margin of the symbol field; and finally, the area $N_3$ which extends along the lower margin of the symbol field. Associated with each of these three areas is a scanning cam $N_1$, $N_2$ and $N_3$, respectively, which closes during scanning of the corresponding area a coacting contact $n_1$, $n_2$, $n_3$. Each contact, upon closure, causes energization of an associated relay indicated in Fig. 13 at $R_1$, $R_2$ and $R_3$, respectively. These contacts and relays are disposed in a circuit which extends in parallel with the printing system 41 to the amplifier output tube 42.

The relays $R_2$ and $R_3$ actuate contacts $r_2$ and $r_3$, respectively, for actuating the motor 43 (Fig. 14) to rotate in one or the other direction of rotation. The motor 43 adjusts the condenser 44 which in turn varies the tuning of the tone generator 45. The latter acts upon an amplifier 46 to drive the synchronous motor 47 which serves to drive the device 48.

The relay $R_1$ of Fig. 13 actuates a contact $r_1$ of Fig. 14 which has a slow-to-release action, and this contact connects the condenser 49 which is of relatively large capacity for a limited period of time into the tuning circuit of the tone generator for the purpose of causing considerable de-tuning thereof so as to bring about a considerable variation of the period of rotation of the synchronous motor 47.

The arrangement operates as follows:

Whenever the central marginal area is scanned by the cam $N_1$ the contact $n_1$ (Fig. 13) will prepare the circuit of relay $R_1$. If image dots occur at such times in the center of the marginal zone, relay $R_1$ will be energized and will close contact $r_1$, shown in Fig. 14, thereby causing for a brief period considerable variation of the driving speed.

The relay $R_1$ energizes responsive to a single impulse. The phase of the drive to be regulated is thus varied. The relay $R_1$ also actuates the contact $r_1$ (Fig. 13) which is slow to release, thereby disconnecting the relays $R_2$ and $R_3$, preferably for the duration of the closure of contact $r_1$ of Fig. 14.

The impulse within the area $N_1$ will cease responsive to diminution of the displacement of the symbols from the symbol field, and the relay $R_1$ accordingly deenergizes and causes closure of contact $r'_1$. The relays $R_2$ and $R_3$ can now become energized, always upon closure of the associated contacts $n_2$ and $n_3$, i. e., when symbol dots appear within the corresponding zones. The time constants of the relays $R_2$ and $R_3$ are so adjusted by the value of the series resistance 50 and the condensers 51 and 52 that they respond after the relay $R_1$. Depending upon whether the symbols are displaced upwardly or downwardly, one of these relays will be energized and will cause rotation of the motor 43 (Fig. 14) in one or the other direction, as the case may be, by the closure of its associated contact $r_2$ or $r_3$, thereby detuning the tone generator for the corresponding interval of contact closure in one or the other direction. These operations result in a continuous variation of the speed of rotation of the synchronous motor 47.

The last described embodiment is of course not limited to the use of a generator 45. The apparatus may be similarly controlled, for example, by the use of mechanical gearing governed by suitable relay means.

We claim:

1. Apparatus for synchronizing receivers in the recording of transmitted symbols in a facsimile printer system of the type in which the symbols are within a symbol field individually subdivided in the form of fixed impulse series for the continuous scanning and printing thereof to form the corresponding symbols on a suitable record in the receiver having driving means including a motor, comprising a plurality of margin scanning means in the receiver, said margin scanning means being independent of the field scanning means for the reproduction of the image dots to form the symbols and being effective to scan the marginal zones to detect image dots appearing therein as a result of displacement of symbols from the predetermined symbol field due to non-synchronous operation of the receiver, a correction device, said correction device comprising contacts respectively associated with said margin scanning means, relay means controlled by said contacts, correction means controlled by said relay means, for respectively retarding or accelerating the speed of said driving means of the receiver depending on the detection of image dots in said marginal zones by said margin scanning means, and circuit control means for maintaining the operation of said correction means until such a time when no image dots are detected by said margin scanning means in said marginal zones when synchronous operation is restored.

2. The apparatus defined in claim 1, comprising individual correction means for cooperation with each margin scanning means, and means effective upon operative actuation of each correction means for blocking the actuation of the other correction means.

3. The apparatus defined in claim 1, comprising individual correction means for each margin scanning means, and delay means in said circuit control means including slow-to-release relay means for blocking the operative actuation of one of said correction means for a period of time which exceeds the operative response interval of another of said correction means.

4. The apparatus defined in claim 1, comprising delay-producing means in said circuit control means for prolonging the operative actuation of said correction means beyond its effective operation period.

5. The apparatus defined in claim 1, comprising means for blocking the operative actuation of said correction means in the presence of displacement of said image dots by a predetermined amount.

6. The apparatus defined in claim 1, wherein the presence of image dots detected by said margin scanning means is signalled to said correction means by impulses directed thereto, and control means cooperating with said correction means for rendering impulses ineffective which are shorter than a predetermined interval.

7. The apparatus defined in claim 1, wherein the presence of image dots detected by said margin scanning means is signalled to said correction means by impulses directed thereto, and delay means in said circuit control means cooperating with said correction means for delaying operative actuation thereof for an interval extending over a predetermined plurality of impulses.

8. The apparatus defined in claim 1, comprising individual correction means for each margin scanning means, means cooperating with each correction means, upon actuation thereof, for blocking the operative actuation of the other correction means, and means in said circuit control means governed by an actuated correction means which is effective upon initiating the blocking of the other correction means for reducing its own operative response period.

9. The apparatus defined in claim 1, having a single correction means cooperating with said marginal scanning means, and auxiliary means for scanning the symbol field which is operative to coact with said correction means to determine the direction of operative actuation thereof.

10. The apparatus defined in claim 1, together with individual correction means for each margin scanning means, one of said correction means being initially adjusted to vary the speed of said drive means in a predetermined direction, and means controlled by the other correction means upon actuation thereof for changing said adjustment to cause said first correction means to effect variation of speed of said drive means in the opposite direction.

11. The apparatus defined in claim 1, together with individual correction means for each margin scanning means, said correction means cooperating to determine the position of the scanning gap at the end of a scanning stroke formed by image dots (I-stroke), which gap is in synchronous operation positioned within the marginal zone, for the purpose of causing speed variation to effect a falling tendency if said gap has shifted upwardly and a rising tendency if it has shifted downwardly.

12. The apparatus defined in claim 1, comprising a pair of margin scanning means, one for the upper and one for the lower half of the symbol field, circuit means for each scanning means, each of said circuit means producing the sum of the voltage of the impulses received responsive to actuation of its associated scanning means, an element which is responsive to the voltage differential to determine the operative actuation of the correcting means coacting with said marginal scanning means.

13. The apparatus defined in claim 1, together with individual correction means for each margin scanning means one of said correcting means being biased for preferred operative response in the presence of scanning conditions which are equally effective to both correction means.

14. The apparatus defined in claim 1, together with individual correction means for each margin scanning means, and means coacting with one of said correction means upon operative actuation thereof for disconnecting said correction means from its associated scanning means.

15. The apparatus defined in claim 1, together with individual correction means for each scanning means a pair of serially related relays coacting with one of said correction means, one of said relays being in circuit with the corresponding scanning means and being effective to cause actuation of the other relay, said other relay being effective to initiate the regulation of the speed of said driving means and to interrupt upon energization the circuit of said first relay.

16. The apparatus defined in claim 1, together with a polarized relay for governing the speed variation of said driving means, and circuit means for connecting in parallel relationship the correction control means governed by said marginal scanning means and connecting said parallel circuit in series with said polarized relay.

17. The apparatus defined in claim 1, together with an additional scanning means for separately scanning portions of the symbol field, the scanning of each portion extending into the adjacent zone by an amount which reaches into and overlaps the marginal zone, and circuit means governed by said additional scanning means for controlling the operation of said correction means.

18. The apparatus defined in claim 1, together with means associated with and controlled by said correction means for visually signalling the corrective operation effected thereby.

19. The apparatus defined in claim 1, wherein said correction means is effective to vary the phase of said driving means in the presence of considerable displacement of said symbol image dots in a predetermined marginal zone and to effect variation of the speed of rotation of said driving means in the presence of slight displacement of said image dots in another marginal zone.

20. The apparatus defined in claim 1, wherein said correction means is effective to vary the phase of said driving means in the presence of considerable displacement of said symbol image dots in a predetermined marginal zone and to effect variation of the speed of rotation of said driving means in the presence of slight displacement of said image dots in another marginal zone, and means for superimposing upon the driving means to be regulated an acceleration or retardation, respectively, for the purpose of effecting said phase variation.

21. The apparatus defined in claim 1, wherein said correcting means is effective to vary the phase of said driving means in the presence of considerable displacement of said symbol image dots in a predetermined scanning zone and to effect variation of the speed of rotation of said driving means in the presence of slight displacement of said image dots in another scanning zone, and means for varying the frequency of the speed governor stabilizing means for the purpose of varying the speed of rotation of said driving means.

22. The apparatus defined in claim 1, wherein said correcting means is effective to vary the phase of said driving means in the presence of considerable displacement of said symbol image dots in a predetermined scanning zone and to effect variation of the speed of rotation of said driving means in the presence of slight displacement of said image dots in another scanning zone, means for varying the frequency of the speed governor stabilizing means for the purpose of varying the speed of rotation of said driving means, and means responsive to said frequency variation for simultaneously accelerating or slowing up, respectively, the driving means to be regulated until the adjusted synchronous speed becomes effective.

23. Apparatus for synchronizing receivers in a facsimile system wherein individual symbols are subdivided within symbol fields into symbol image dots which are transmitted in the form of fixed impulse series for continuous scanning and corresponding printing thereof at the receiver, comprising three scanning means in the receiver for scanning the symbol field and marginal zones thereof so as to detect image dots which appear in said marginal zones as a result of displacement of the symbols from the symbol field in the presence of nonsynchronous operation of the receiver, correction means cooperating with said scanning means, and control means governed by said correction means for respectively retarding or accelerating the speed of operation of the receiver-driving means, depending on the detection of image dots in said marginal zones, said control means being operatively effective until such a time when no image dots are detected in said marginal zones, when synchronous operation is restored, the operative response periods of the correction means cooperating with said scanning means being so adjusted that one of said correction means, which responds to the scanning of a full line including the marginal zone, responds only to I-strokes and prepares for operation the correction means cooperating with the other two scanning means, said last-named correction means effecting correction each in different corrective sense and responding to the scanning of mutually symmetrically complementary zones which supplement one another to form at least one full line, only one of said last-named correction means being operatively effective whose zone is found by the associated scanning means to be completely occupied by image dots.

24. Apparatus for synchronizing receivers in a facsimile system wherein individual symbols are subdivided within symbol fields into symbol image dots which are transmitted in the form of fixed impulse series for continuously scanning and corresponding printing thereof at the receiver, comprising margin scanning means in the receiver, independent of the means therein for the visual reproduction of the image dots to form the symbols, for scanning the marginal zone adjacent the symbol field so as to detect image dots which appear in said marginal zone as a result of displacement of the symbol from the predetermined symbol field due to nonsynchronous operation of the receiver, correction means cooperating with said margin scanning means, control means governed by said correction means for respectively retarding or accelerating the speed of the driving means of the receiver, depending on the detection of image dots in said marginal zone, said control means being operatively effective until such a time when no image dots are detected by said margin scanning means in said marginal zone, when synchronous operation is restored, and two additional scanning means, one for scanning the upper and the other for scanning the lower half of the symbol field, each of said additional scanning means being adapted to produce the sum of the voltage of received impulses, an element which is responsive to the voltage differential of said impulses, said scanning means controlling the operation of said element, said element coacting with the correction means associated with said marginal scanning means in such a manner that corrective operation is effected only at times when the marginal scanning and the symbol field scanning indicate identical corrective operations.

25. Apparatus for synchronizing receivers in a facsimile system wherein individual symbols are subdivided within symbol fields into symbol image dots which are transmitted in the form of fixed impulse series for continuously scanning and corresponding printing thereof at the receiver, comprising margin scanning means in the receiver, independent of the means therein for the visual reproduction of the image dots to form the symbols, for scanning the marginal zone adjacent the symbol field so as to detect image dots which appear in said marginal zone as a result of displacement of the symbol from the predetermined symbol field due to nonsynchronous operation of the receiver, correction means cooperating with said margin scanning means, control means governed by said correction means for respectively retarding or accelerating the speed of the driving means of the receiver, depending on the detection of image dots in said marginal zone, said control means being operatively effective until such a time when no image dots are detected by said margin scanning means in said marginal zone, when synchronous operation is restored, and two additional scanning means, one for scanning the upper and the other for scanning the lower half of the symbol field, each of said additional scanning means being adapted to produce the sum of the voltage of received impulses, an element which is responsive to the voltage differential of said impulses, said scanning means controlling the operation of said element, said element coacting with the correction means associated with said marginal scanning means in such a manner that corrective operation is effected only at times when the marginal scanning and the symbol field scanning indicate identical corrective operations, and means effective in the presence of slight displacement of said image dots for rendering inoperative the corrective operation determined by said two additional scanning means.

26. Apparatus for synchronizing receivers in a facsimile system wherein individual symbols are subdivided within symbol fields into symbol image dots which are transmitted in the form of fixed impulse series for continuously scanning and corresponding printing thereof at the receiver, comprising margin scanning means in the receiver, independent of the means therein for the visual reproduction of the image dots to form the symbols, for scanning the marginal zone adjacent the symbol field so as to detect image dots which appear in said marginal zone as a result of displacement of the symbol from the predetermined symbol field due to nonsynchronous operation of the receiver, correction means cooperating with said margin scanning means, control means governed by said correction means for respectively retarding or accelerating the speed of the driving means of the receiver, depending on the detection of image dots in said marginal zone, said control means being operatively effective until such a time when no image dots are detected by said margin scanning means in said marginal zone, when synchronous operation is restored, and two additional scanning means, one for scanning the upper and the other for scanning the lower half of the symbol field, each of said additional scanning means being adapted to produce the sum of the voltage of received impulses, an element which is responsive to the voltage differential of said impulses, said scanning means controlling the operation of said element, said element coacting with the correction means associated with said marginal scanning means in such a manner that corrective operation is effected only at times when the marginal scanning and the symbol field scanning indicate identical corrective operations, all of said scanning means being initially operative at the time of starting transmission, and means effective after transmission of a predetermined number of symbols for rendering inoperative the corrective operation determined by said two additional scanning means.

27. Apparatus for synchronizing receivers in a facsimile system wherein individual symbols are subdivided within symbol fields into symbol image dots which are transmitted in the form of fixed impulse series for continuously scanning and corresponding printing thereof at the receiver, comprising margin scanning means in the receiver, independent of the means therein for the visual reproduction of the image dots to form the symbols, for scanning the marginal zone adjacent the symbol field so as to detect image dots which appear in said marginal zone as a result of displacement of the symbol from the predetermined symbol field due to nonsynchronous operation of the receiver, correction means cooperating with said margin scanning means, control means governed by said correction means for respectively retarding or accelerating the speed of the driving means of the receiver, depending on the detection of image dots in said marginal zone, said control means being operatively effective until such a time when no image dots are detected by said margin scanning means in said marginal zone, when synchronous operation is restored, and two additional scanning means, one for scanning the upper and the other for scanning the lower half of the symbol field, each of said additional scanning means being adapted to produce the sum of the voltage of received impulses, an element which is responsive to the voltage differential of said impulses, said scanning means controlling the operation of said element, said element coacting with the correction means associated with said marginal scanning means in such a manner that corrective operation is effected only at times when the marginal scanning and the symbol field scanning indicate identical corrective operations, and means for scanning the central area of the two marginal zones, said last-named means being effective responsive to detection of impulses to open a contact which normally shunts the circuit of said two additional scanning means.

28. In a facsimile synchronizing system in which individual symbols are subdivided within symbol fields into symbol image dots which are transmitted in the form of impulse series for continuous scanning and printing thereof at the receiver to form the corresponding symbols within like symbol fields which are in the presence of synchronous operation of the receiver bordered by marginal zones free of symbol image dots, an arrangement for maintaining synchronous operation of the receiver by corrective speed control of the drive thereof, depending solely on the occurrence of symbol image dots in said marginal zones due to nonsynchronous operation of said drive, said corrective speed control comprising sensing means for scanning said marginal zones to detect symbol image dots, a control circuit in which said sensing means is connected and which receives impulses through the medium of said sensing means which correspond to symbol image dots detected thereby in said marginal zones, correcting means in said circuit responsive to such impulses, means governed by said correcting means for effecting the speed of operation of said receiver drive means by increase or decrease of the speed thereof, depending on the position of said symbol image dots detected by said sensing means, and control means cooperating with said correcting means for maintaining the corrective tendency thereof to continue the speed adjustment of said drive means in a predetermined direction until such a time when no symbol image dots are detected in said marginal zone by said sensing means.

29. The structure defined in claim 28, comprising two correcting means which are operative in opposite corrective directions, one of said correcting means for part of each marginal zone, said correcting means cooperating in such a manner that the correcting means which becomes first operative blocks the operative actuation of the other correcting means for a predetermined interval.

30. The structure defined in claim 28, comprising two correcting means which are operative in opposite corrective directions, one of said correcting means for part of each marginal zone, one of said correcting means being operative upon actuation thereof to block the operative actuation of the other correcting means for the purpose of effecting regulation of the speed of said drive means in a predetermined direction responsive to simultaneous operation of both correcting means.

31. The structure defined in claim 28, comprising two correcting means which are operative in opposite corrective directions, one of said correcting means for part of each marginal zone, and control means operated by each correcting means upon actuation thereof for blocking the actuation of the other correcting means for the duration of an interval which exceeds the energizing response thereof.

32. The structure defined in claim 28, comprising two correcting means which are operative in opposite corrective directions, one of said correcting means for part of each marginal zone, and control means operated by each correcting means upon actuation thereof for blocking the actuation of the other correcting means, said last-named control means comprising delay means for reducing the energizing response of its associated correcting means.

33. The structure defined in claim 28, wherein said correcting means comprises a plurality of relays, each relay being connected in a circuit including the sensing means associated with a marginal zone, the relay thus associated with a marginal zone in which symbol image dots are detected being operatively responsive thereto, and additional relay means selected by the operation of such relay for governing the regulation of the speed of said receiver drive.

34. The structure defined in claim 28, wherein said correcting means comprises a pair of relays connected in parallel, a polarized relay controlled by said sensing means, a contact controlled by said polarized relay being in a circuit in series with said pair of relays.

35. The structure defined in claim 28, wherein said sensing means comprises a plurality of contacts, and cam means for successively operating said contacts.

36. The structure defined in claim 28, wherein said correcting means comprises a plurality of relays, and rectifier means connected with said relays for limiting the voltage therefor.

RUDOLF HELL.
HEINZ TAUDT.

References Cited in the file of this patent

UNITED STATES PATENTS

| Number | Name | Date |
|---|---|---|
| 2,182,000 | Nichols | Dec. 5, 1937 |
| 2,329,077 | Nichols | Sept. 7, 1943 |
| 2,530,516 | Finch | Nov. 21, 1950 |